Dec. 30, 1941.     H. H. BURKE     2,268,184
PACKAGE-TIE-AFFIXING MACHINE
Filed Nov. 2, 1940     11 Sheets-Sheet 1

Fig.1.

Inventor:
Hubert Hastings Burke
By Benton Baker
Attorney

Dec. 30, 1941.  H. H. BURKE  2,268,184
PACKAGE-TIE-AFFIXING MACHINE
Filed Nov. 2, 1940  11 Sheets-Sheet 7

Inventor:
Hubert Hastings Burke
By Bouton Baker
Attorney

Dec. 30, 1941.    H. H. BURKE    2,268,184
PACKAGE-TIE-AFFIXING MACHINE
Filed Nov. 2, 1940    11 Sheets-Sheet 10

FIG.15.

Inventor:
Hubert Hastings Burke
By Benton Baker
Attorney

Dec. 30, 1941.   H. H. BURKE   2,268,184

PACKAGE-TIE-AFFIXING MACHINE

Filed Nov. 2, 1940    11 Sheets-Sheet 11

Inventor:
Hubert Hastings Burke
By Benton Baker
Attorney

Patented Dec. 30, 1941

2,268,184

UNITED STATES PATENT OFFICE 2,268,184

PACKAGE-TIE-AFFIXING MACHINE

Hubert Hastings Burke, Evanston, Ill.

Application November 2, 1940, Serial No. 364,049

2 Claims. (Cl. 93—36.9)

My invention relates to a new and improved machine for affixing ties to packages, boxes, cartons and other containers, including boxes of the type shown and described in United States Letters Patent No. 1,922,354, granted to me August 15, 1933. The advantages of having such an article prepared and ready for use with tie affixed will be readily understood. This machine combines means for clamping the article, to which a tie is to be affixed, in position, with means for punching holes in the same and running a tie therethrough, and means for applying an adhesive to the tie to secure it in position, all operable by a single operator. My present invention thus provides a simple, easily operable machine whereby a tie may be quickly and effectively affixed to any of a wide variety of packages, boxes and other forms of container, making quantity production possible with a minimum of labor.

Further objects are to provide a construction of maximum simplicity, efficiency, economy and ease of assembly and operation, and such further objects, advantages and capabilities as will more fully appear and are inherently possessed thereby.

The invention further resides in the combination, construction and arrangement of parts illustrated in the accompanying drawings, and while I have shown therein a preferred embodiment it is to be understood that the same is susceptible of modification and change and comprehends other details, arrangements of parts, features and constructions without departing from the spirit of the invention.

Referring to the drawings:

Fig. 13 is a sectional view along the line 3—3 of Fig. 2, showing the position of the parts after first movement of treadle 11 and clamping of the work 14a, in this instance a box-cover, in position to be operated on.

Figure 2:
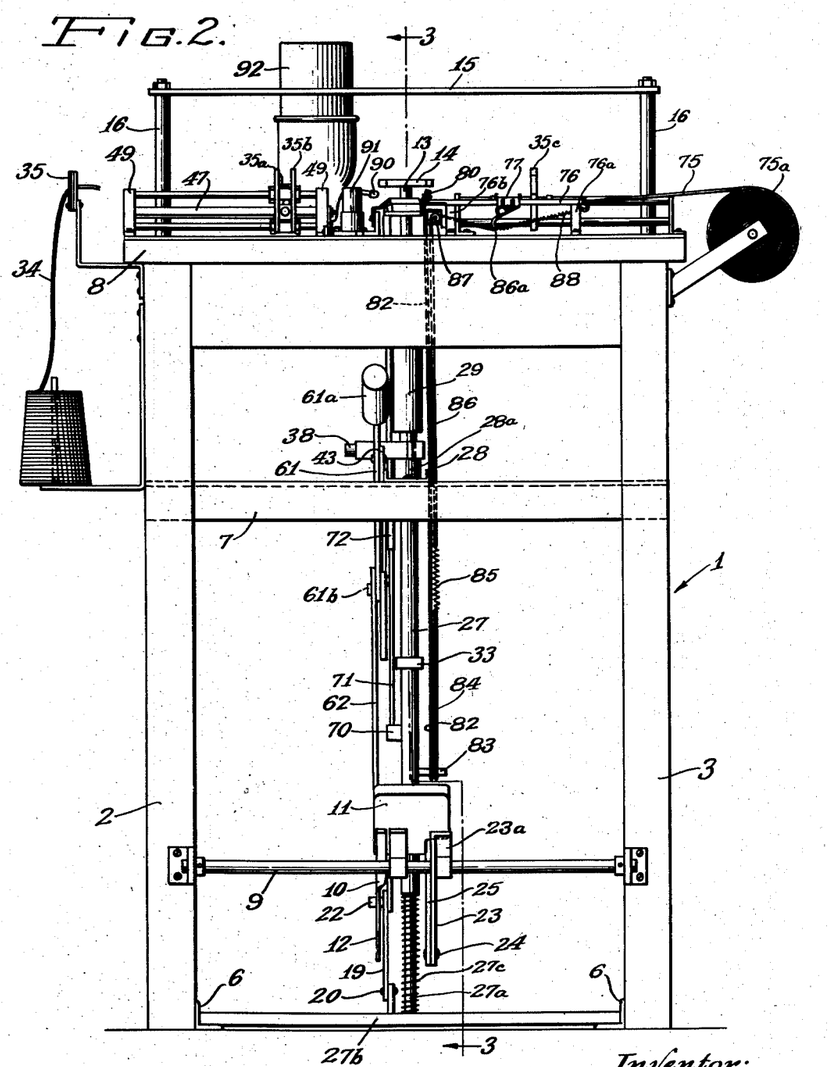
Fig. 2 is a front view of my machine.
Figure 3:
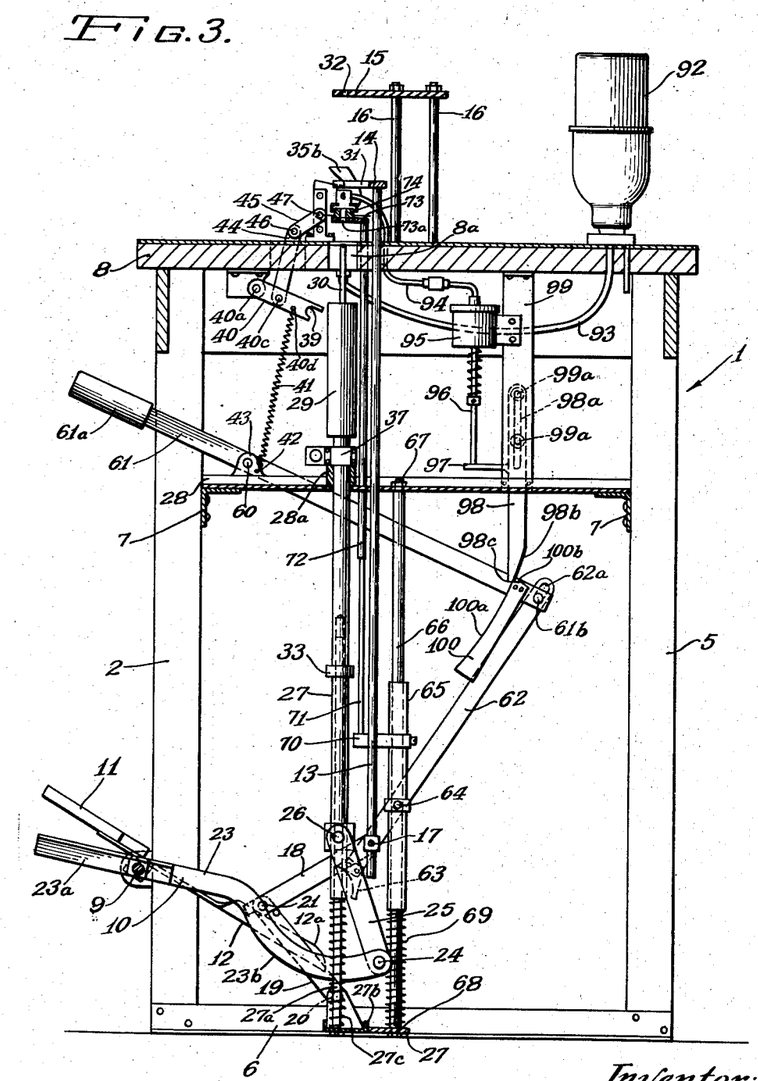
Fig. 3 is a sectional view along the line 3—3 of Fig. 2.
Figure 4:
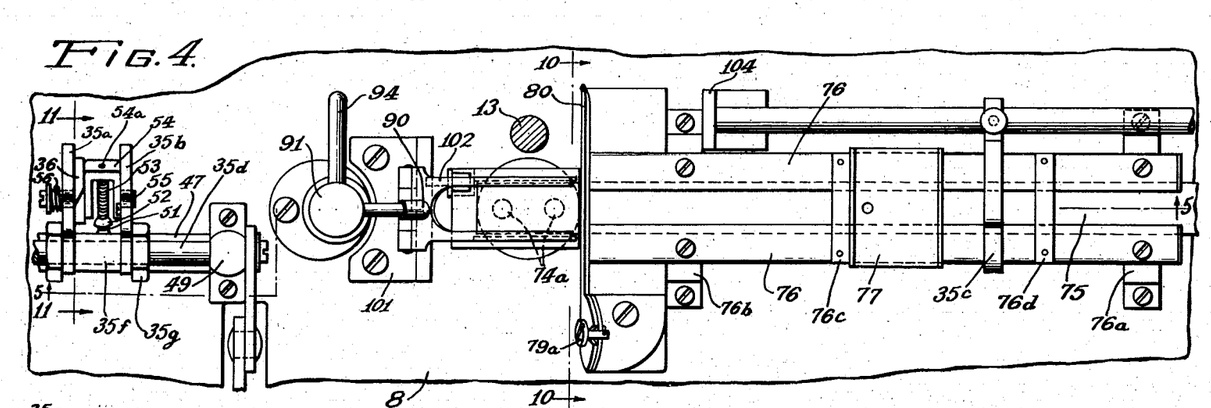
Fig. 4 is an enlarged plan view of portions of the mechanism shown in Fig. 2.
Figure 5:
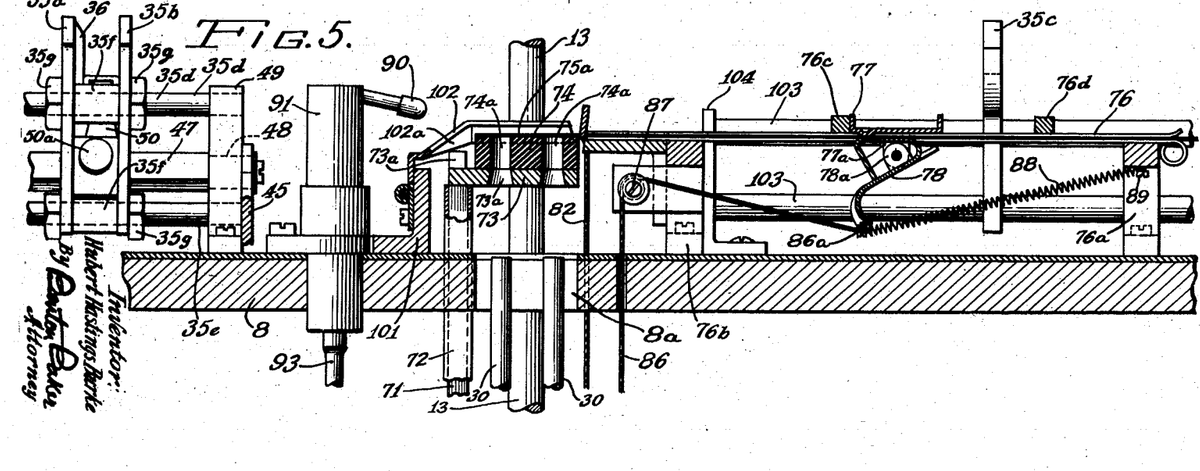
Fig. 5 is a sectional view along the line 5—5 of Fig. 4.
Figure 13:
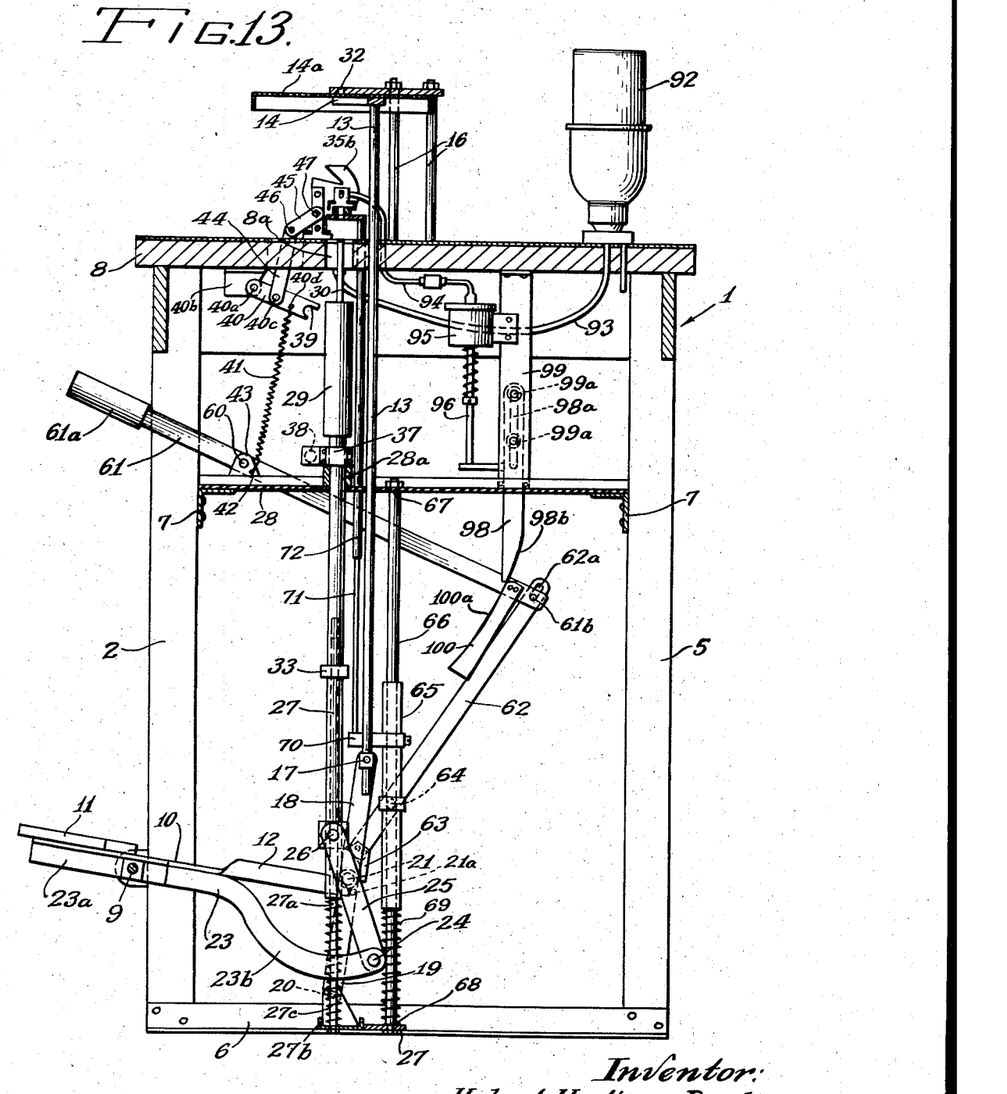

Referring to the drawings, my invention may be described as follows:

I provide a stand 1 having supports 2, 3, 4 and 5, angular base braces 6, 6 between supports 2 and 5 and 3 and 4, respectively, and intermediate angular braces 7, 7 between supports 2 and 3 and 4 and 5, respectively, and table or top portion 8, all suitably secured. On supports 2 and 3 near their lower extremities is mounted horizontally disposed rod 9. Pivoted upon rod 9 slightly to the left of its middle portion is lever 10 having outwardly extending treadle portion 11 and inwardly extending portion 12 with cam surface 12a. Slidably mounted in table 8 is vertically extending rod 13 having mounted on the upper end thereof a horizontally disposed flat plate 14 adapted to clamp a flat surface of work, as shown, a box cover 14a, to be operated on, against the underside of horizontal platform 15, which is supported above table 8 by means of posts 16 secured thereto. Near the lower end of rod 13 is provided a fixed, horizontal pivot pin 17 to which is pivoted one end of upper link 18 of toggle 18, 19, the lower link 19 of which is pivoted at its lower end to pin 20 mounted on base brace 6, said links 18 and 19 being pivoted at 21 by a pin having a horizontal extension 22, Lever 10, shifting portion 12 thereof, rod 13, links 18, 19 and pin 22, are so arranged and proportioned that when they are in normal position as shown in Figs. 2 and 3, if treadle 11 be depressed a suitable distance, surface 12a will engage pin 22 and, through the operation of the toggle 18, 19, cause rod 13 to rise and the plate or clamp 14 disposed on the upper end thereof approximately to engage the underside of platform 15, sufficient space being left therebetween merely to accommodate the article 14a to be operated on and which is to be clamped in position as shown in Fig. 13. A stop 21a is provided to retain the links 18, 19 in straightened position until broken as hereinafter described.

Lever 23 having outwardly extending portion 23a and inwardly extending portion 23b, suitably curved as shown in Fig. 3, is also pivotally mounted on rod 9 and so positioned and arranged with respect to lever 10 and treadle 11 that when lever 23 is in normal position, as shown in Fig. 3, the treadle 11 has been depressed to the position shown in Fig. 13 and the article to be operated on or work 14a is in clamped position as there shown, treadle 11 will engage the portion 23a and further downward movement of treadle 11 will cause the outer end of lever 23 to move downward and the inner end 24 thereof to rise. Pivotally connected at one end with the inner end 24 of lever 23 is link 25, the opposite end of which is pivotally connected at 26 with vertically extending hollow rod 27.

Figure 14:
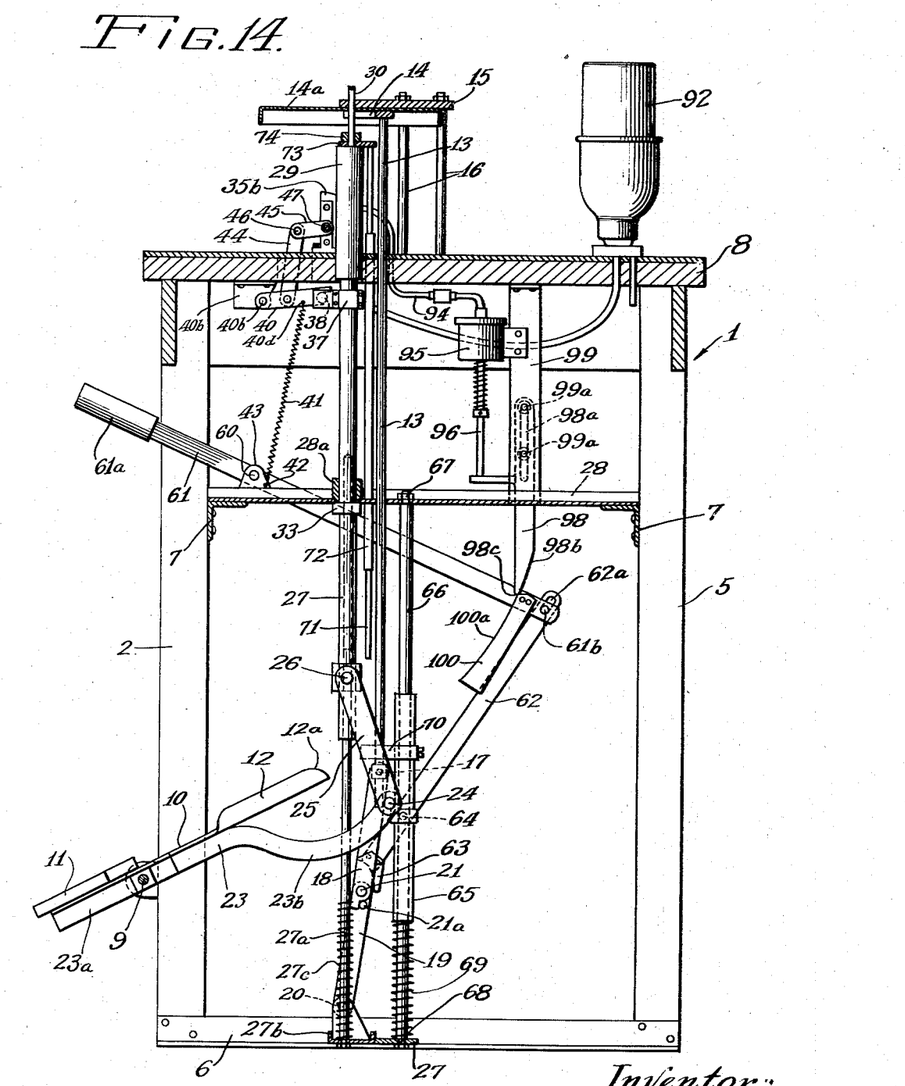
Fig. 14 is a sectional view along line 3—3 of Fig. 2 showing the position of the parts after second downward movement of the treadle 11 and elevation of needles 30 to uppermost position.

Rod 27 at its lower end is slidably mounted upon the upper end of vertical rod 27a whose lower end is seated in cross-member 27b, which is secured to base braces 6, 6 and is opposed by coil spring 27c also mounted on rod 27a. The mid-portion of rod 27 slidably engages a bushing 28a mounted in cross-member 28. The upper end of rod 27 is fitted in cylinder 29 in which are seated two parallel, vertically extending needles or punch members 30 adapted upon upward movement of the rod 27 to pass through cut-out portion 31 of clamp 14 and suitably placed openings 32, 32 in platform 15, respectively, penetrating the work 14a so as to make suitable holes 14a' therein for the reception of a tie 34d; an opening 8a being provided in table 8 for the passage of cylinder 29. The lever 23, the link 25, the rod 27, the cylinder 29, and the needles 30 are so proportioned and arranged that the uppermost position of the needles is attained when the treadle 11 reaches its lowermost position as shown in Fig. 14. By way of safety a stop 33 is adjustably secured to rod 27 and positioned so that when the desired uppermost position of the needles 30 is reached the stop 33 will engage the underside of channelled cross-member 28, thus preventing further upward movement of rod 27 and needles 30.

Figure 15:
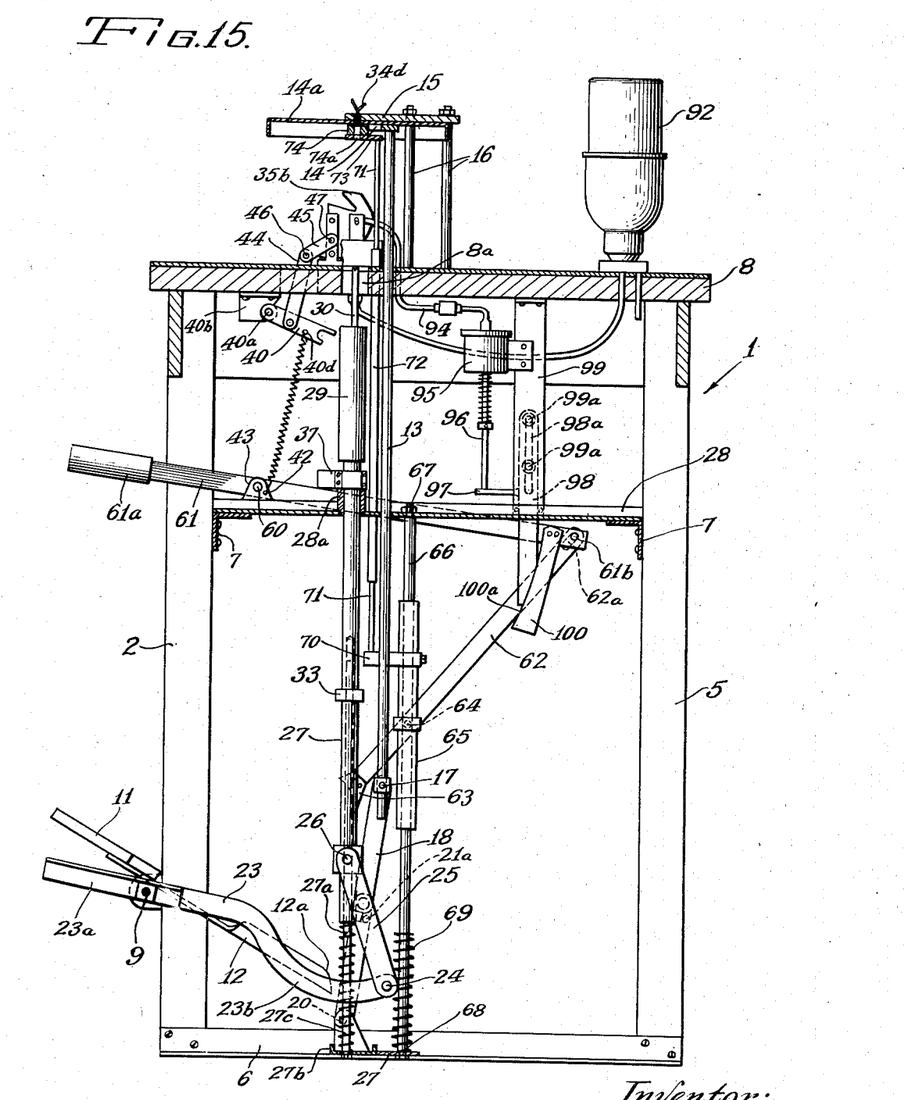
Fig. 15 is a sectional view along line 3—3 of Fig. 2, showing the position of the parts after depression of lever 61 and retraction of needles 30.

The work having been penetrated or punched as stated, the treadle 11 may be released. Upon release of this treadle, the cylinder 29 being weighted the rod 27 and needles 30 will descend to normal position shown in Fig. 3, the lever 23 and link 25 being proportioned to avoid a dead center as shown in Fig. 14; the rod 13 and plate or clamp 14 remaining in uppermost position, holding the work 14a in clamped position, due to the action of toggle 18, 19, as shown in Fig. 15.

Figures 6, 7:
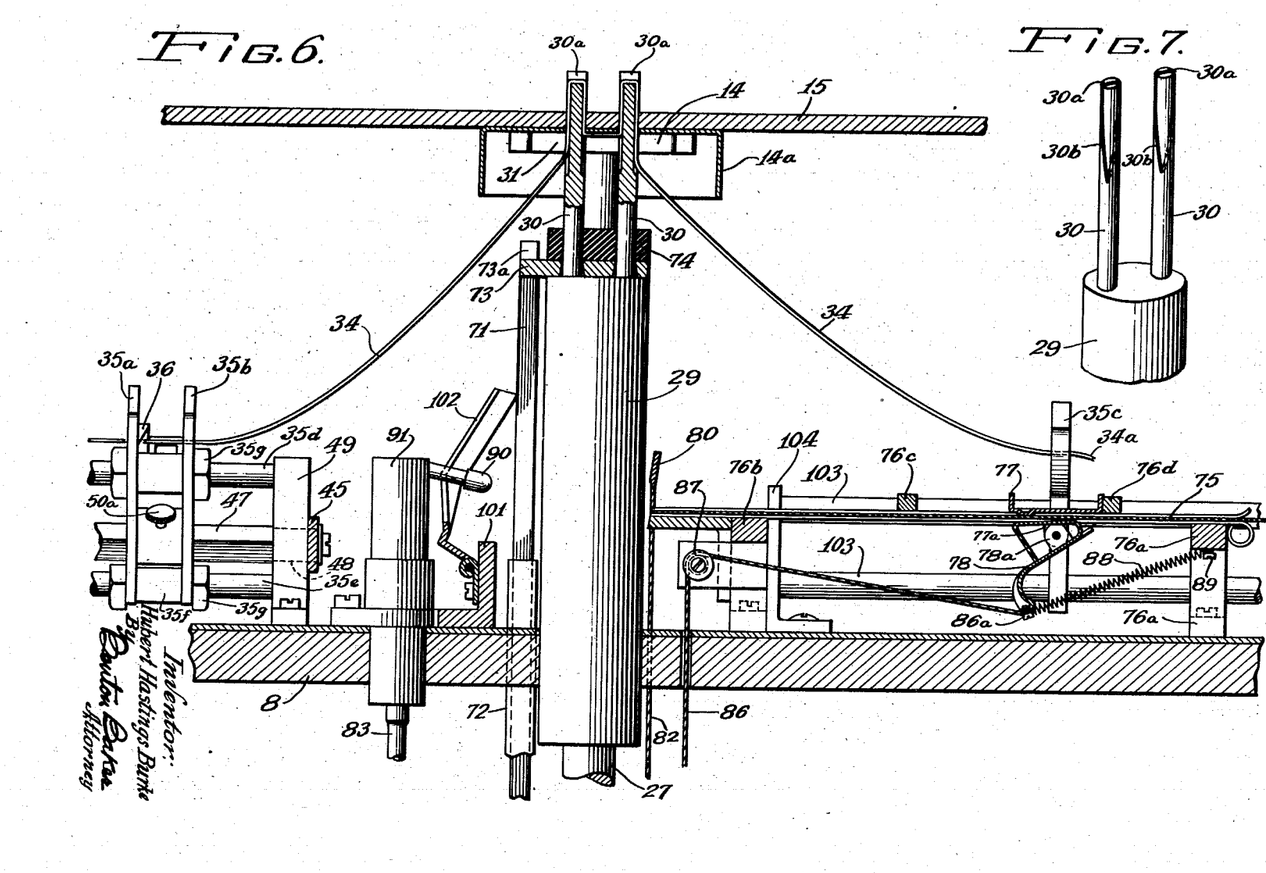
Fig. 6 is an enlarged view of a portion of the punching mechanism in raised position, partially in section.
Fig. 7 is an enlarged view of the upper portion of the needles 30 and cylinder 29 in perspective.
Figures 8, 9:
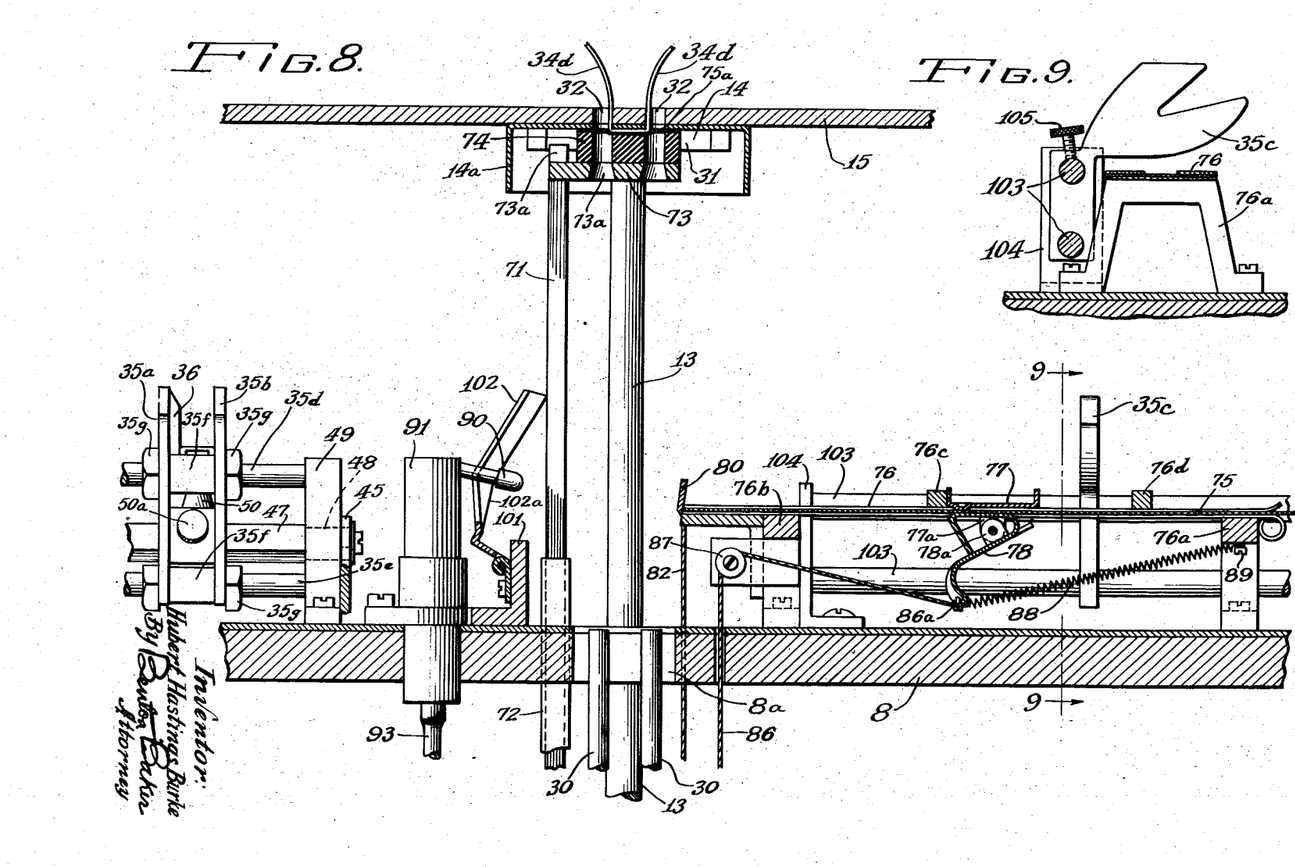
Fig. 8 is an enlarged view of the mechanism shown in Fig. 6 but with knife 36 raised, needles 30 retracted and adhesive applied to tie.
Fig. 9 is a sectional view along the line 9—9 of Fig. 8.

Needles 30 are provided at their upper ends with transverse slots 30a which extend spirally part way down the sides 30b of the needles as shown in Fig. 7. These slots are positioned so as to engage twine or other suitable tie material 34 supplied from means positioned preferably at one side of the machine as shown in Fig. 2 and extending through guide or holding means 35, 35a, 35b and slots 30b transversely of the machine, the end 34a (Fig. 6) thereof being held by the operator at 35c, so that the material will be carried through the work by the needles 30.

Cutting means in the form of a knife 36 for cutting the tie material 34 and mechanism for operating the same are shown in Figs. 2, 3, 4, 6, 11, 12, 13, 14 and 15. Knife 36 is so constructed positioned and arranged that it will sever tie material 34 when needles 30 attain their uppermost position as shown in Figs. 6 and 14. To accomplish this rod 27 carries bracket 37, suitably secured and spaced below cylinder 29, bracket 37 having at one side lug or pin 38 adapted to engage the free end 39 of lever 40, which is pivoted at its other end 40a to bracket 40b secured to the underside of table 8. Knife 36 and lever 40 are normally held in the respective positions shown in Figs. 3, 11, 13 and 15 by means of springs 41, the upper and lower ends of which are respectively connected at 40d with lever 40 and at 42 with bracket 43 secured to cross-member 28, knife 36 being connected with lever 40 through links 44 and 45, which are pivoted respectively at 40c and 46; the upper end of link 45 being seated in the upper rectangular portion 47 of shaft 48 which is rotatably mounted in supports 49 secured to the top of table 8, as shown in Figs. 2, 3, 4, 5, 11 and 12.

Slidably mounted on rectangular portion 47 of shaft 48 is stud or pedestal 50 having at its outer end ball portion 51, which engages socket 52 mounted on the lower end of coil spring 53; spring 53 having its upper end seated at 54a in cross portion of inverted U-bar 54; bar 54 being pivoted at 55, 56 in guides 35a and 35b, respectively. Knife 36 is also pivoted at 56 to guide 35a abutting one side of U-bar 54 and is secured thereto so as to turn with it on pivot 56. Stops 57 and 58 are provided on one side of guide 35b to limit the movement of U-bar 54 and knife 36. Stops 59 and 59a are also provided on guide 35b to limit the movement of stud 50.

Guides 35a and 35b are slidably mounted on guide rods 35d and 35e and are positioned adjacent the sides of U-bar 54, respectively, so that the tie-cutting mechanism may be shifted as a unit to permit the cutting of ties of various lengths, spacing sleeves 35f and locking nuts 35g being provided to secure the parts together as a unit and set-screw 50a serves to hold the unit in selected position. Guide 35c is similarly slidably supported on rods 103 mounted in supports 104 secured to table 8, and held in position of adjustment by set-screw 105.

Pivoted at 60 in bracket 43 is lever 61 having outer end or handle 61a positioned conveniently for shifting by the operator, and its inner end pivoted at 61b in slot 62a at the upper end of lever 62. Lever 62 carries at its other extremity tripping block 63, and is also pivoted at 64 to sleeve 65, which is slidable upon rod 66, the upper and lower ends of which are anchored at 67 in cross-member 28 and at 68 in an extension of cross-member 27, respectively, the lower portion of rod 66 being fitted with coil spring 69 connected with and adapted normally to hold sleeve 65 in the position shown in Figs. 3, 13 and 14. Secured to sleeve 65 is arm 70 adapted to engage the lower end of rod 71 which is slidable within tube 72 mounted in table 8 and cross-member 28, as shown in Figs. 3, 13, 14 and 15. Mounted on the upper end of rod 71 is block 73, provided with openings 73a through which needles 30 may pass, and adapted to ride on the upper end of cylinder 29 as shown in Fig. 14. Rectangular rubber block, or cushion piece, 74 having openings 74a therein adapted to receive needles 30, engages or may be secured to the top of block 73.

Adhesive, preferably in the form of gummed tape 75, is supplied from a roll supported at one side of the stand 1 as shown at 75a in Fig. 2. This tape with gummed surface uppermost is run through a guide 76 (supported at 76a and 76b) and feeder members 77, 78, transversely of the table 8 to the inner end of guide 76 as shown in Figs. 1, 2, 4, 5 and 8.

Figure 10:
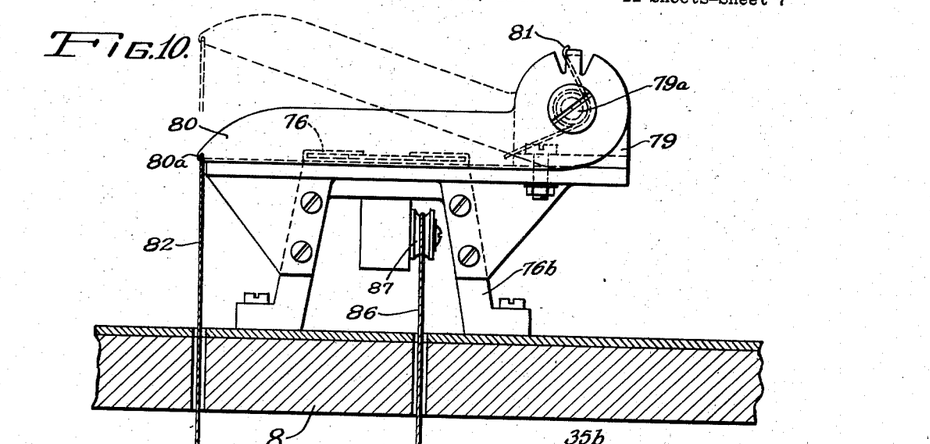
Fig. 10 is a sectional view along the line 10—10 of Fig. 4.
Figures 11, 12:
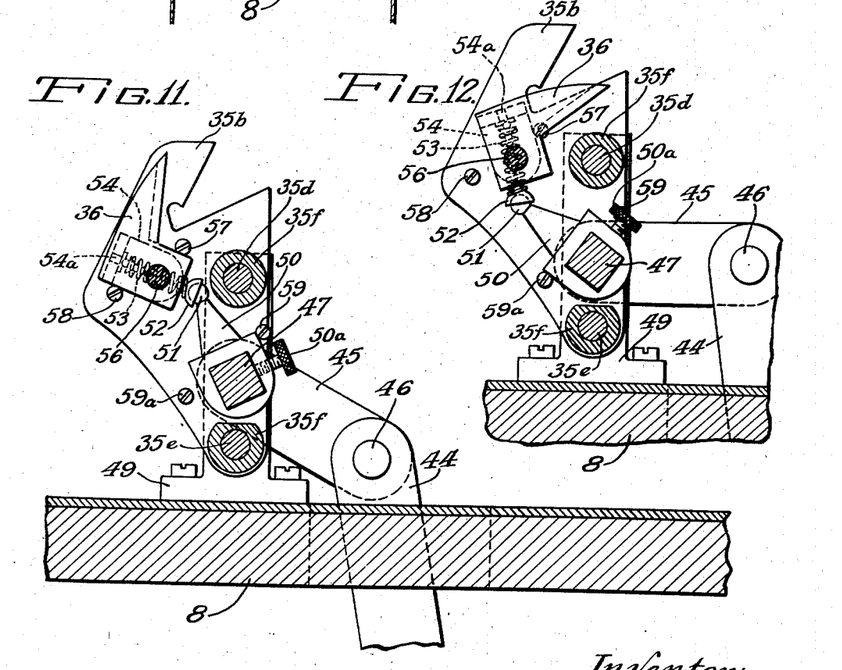
Fig. 11 is a sectional view along the line 11—11 of Fig. 4, showing the tie-cutting knife 36 in pre-cutting position.
Fig. 12 is a sectional view along the line 11—11 of Fig. 4, showing the knife 36 in post-cutting position.

Pivotally mounted at 79a in a support 79 bracketed atop table 8 is a knife 80, normally held in closed position by a cable or wire 82 secured to its outer end 80a as shown in Fig. 10, and extending across the inner end of guide 76 as shown in Figs. 1, 2, 4, 5 and 8.

The other end of wire 82 is looped about arm 83 which is secured to the rod 27 as shown in Fig. 2. Also connected with rod 27 is the lower end of wire 84, the upper end of which connects through spring 85 with wire 86 which passes over roller guide 87 and is attached at its upper end 86a to the inner end of feeder member 78, which is also connected by spring 88 to guide support 76a at 89.

Feeder member 77 is provided with two downwardly extending ears 77a which pivotally engage upwardly extending, corresponding ears 78a on lower feeder member 78. Members 77 and 78 and associated parts are so constructed and arranged that when in normal position, shown in Fig. 2, tape 75 being gripped by members 77, 78, cable or wire 86 is slackened by upward movement of rod 27, member 78 will be acted upon by spring 88, tape 75 released, and members 77, 78 pulled to the right to the position shown in Fig. 6. When rod 27 is retracted, cable 86 becomes taut, members 77, 78 grip tape 75 and are drawn with it to the position shown in Fig. 5, the end of tape 75 extending a suitable distance beyond the position of knife 80 and across block 74 beneath guide 102.

Knife 80 is fitted with a spring 81 shown in Fig. 10, arranged to exert an upward pull on said knife against the downward pull of cable or wire 82. Wires 82, 84, 86 and springs 81, 85 and 88 are so adjusted and arranged that when rod 27 is raised and the wires are slackened, knife 80 will be raised to the position shown in Fig. 6 and in dotted lines in Fig. 10; and when rod 27 is retracted and the wires become taut tape 75 will be advanced before knife 80 is drawn downward to sever the end portion of tape 75. Stops 76c and 76d are provided on guide 76 to limit the movement of feeder members 77, 78.

Supported on bracket 101 secured to the upper side of table 8 is hinged frame or guide 102 for retaining the severed portion 75a of tape 75 in position on block 74. Frame 102 is so constructed and arranged that when rod 71 is raised portion 102a will engage a knob or lug 73a and frame 102 will be raised to the position shown in Fig. 8, and when rod 71 is retracted to normal position frame 102 will return by its own weight to position shown in Fig. 5.

A conventional pneumatic spraying device is provided for moistening the upper gummed surface of tape 75 as shown in Figs. 1, 2, 3, 4, 5 and 15. This comprises nozzle 90 which is connected with container 91 which is supplied with liquid from reservoir 92 through pipe 93. The spraying of liquid is accomplished by air applied to container 91 through pipe 94 from cylinder 95 by the operation of a plunger (not shown), whose spring-pressed stem 96 may be actuated by the operation of lever 61 and associated parts consisting of arm 97 which is secured to slotted bar 98 whose slot 98a slidably engages pins 99a projecting from support 99, the upper and lower ends of which are bracketed to the underside of table 8 and cross-member 28, respectively. The lower portion of bar 98 has a cam surface 98b adapted to engage a corresponding cam surface 100a on arm 100 which is secured to lever 61 near its lower end, and the lower end 98c of bar 98 and the upper end 100b of arm 100 are designed and arranged normally to abut each other, as shown in Figs. 3, 13 and 14.

The construction and arrangement of lever 61 and associated parts is such that when handle 61a is pressed downwardly bar 98 will rise a short distance and until its lower end 98c slips off upper end 100b of arm 100 and cam surface 98b engages cam surface 100a. As bar 98 rises plunger 96 is carried upward by arm 97 applying air to the liquid in container 91 and causing the liquid to be sprayed upon the gummed surface of tape 75 extending over block 74. This downward movement of handle 61a takes up the slack provided by slot 62a. Further downward movement of handle 61a causes lever 62 to act upon sleeve 65 through pivot 64 and the sleeve to rise on rod 66 producing upward movement of rod 71 to the position shown in Fig. 15. This is continued until the severed tape 75 atop block 74 is pressed against the severed tie material 34d and the work 14a and the tie becomes affixed to the work. Upon release of lever 61 it and lever 62 return to normal position by gravity.

Upon completion of the tie-affixing operation clamp 14 and work 14a may be released by a slight upward movement of handle 61a of lever 61 which causes a downward thrust of lever 62 and tripping block 63 causing the latter to engage pin 21—22 and break the links 18, 19 and permit rod 13 and clamp 14 to descend; spring 69 serving normally to hold sleeve 65 in such position that tripping block 63 will normally be in the position shown in Figs. 13 and 14, i. e., slightly removed from pin 21—22.

Figure 1:
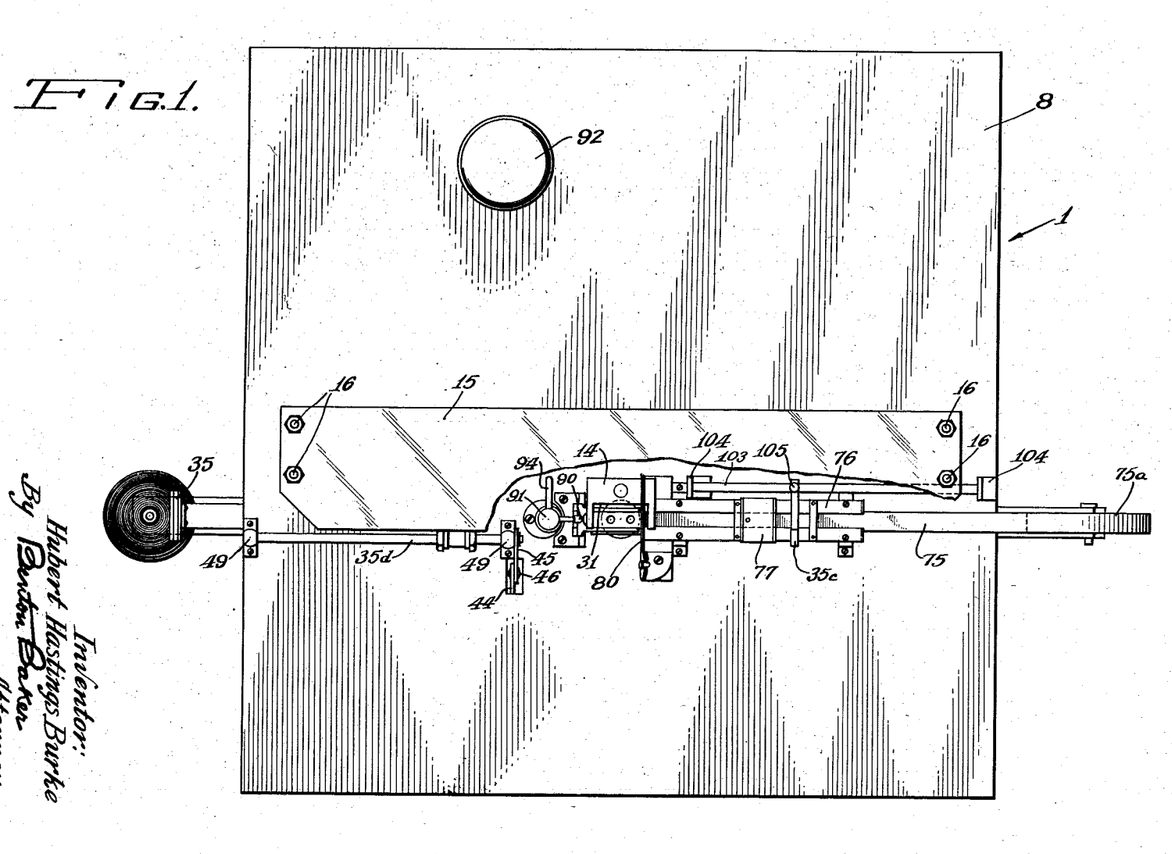
Figure 1 is a plan view of my machine with a portion of the superstructure cut away.
Figures 16, 17, 18:
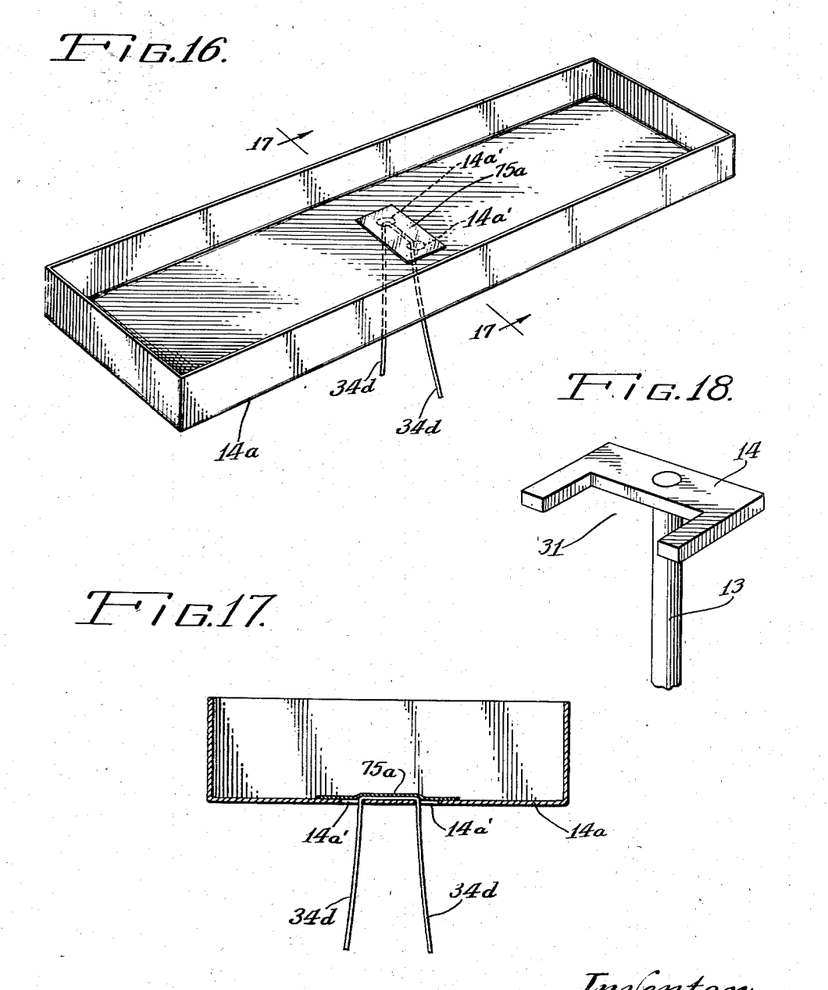
Fig. 16 is a perspective of a box-cover 14a with tie affixed.
Fig. 17 is a sectional elevation along the line 17—17 of a box-cover 14a with tie affixed.
Fig. 18 is a perspective of a clamp member shown in Figs. 2, 3 and others.

The operation of my machine may be described as follows:

The parts being in the position shown in Figs. 1, 2 and 3, tie material 34 is drawn through the guides 35, 35a, 35b, and 35c, and the free end held by the operator, tape 75 with gummed surface uppermost is drawn through the guide 76 and feeder 77, 78 to the inner end of guide 76 abutting knife 80, the operator presses downward on treadle 11 until portion 12 of lever 10 engages pin 21 and links 18, 19 are straightened as shown in Fig. 13 and plate 14 clamps work 14a, as shown as a box-cover, which is momentarily held by the operator in desired operating position. Continued downward pressure on treadle 11 causes it to engage portion 23a of lever 23 and its inner end to rise, moving rod 27 upward, carrying with it arm 37, cylinder 29 and needles 30. Acting on tie material 34 as they rise needles 30 carry such material with them and penetrate work 14a, punching neat holes 14a' therein (this being made possible by the provision of spiral slots 30b). As needles 30 reach their uppermost position pin 38 engages lever 40 and shifts it upward causing knife 36 to shift from the position shown in Fig. 11 to that shown in Fig. 12, and cut the tie material 34 at guide 35a, as shown in Fig. 6. Momentarily holding treadle 11 in depressed position the operator draws the tie material through the holes 14a' and then releases the treadle, rod 27, cylinder 29 and needles 30 then return by gravity to the position shown in Figs. 8 and 15. Meanwhile the upward movement of rod 27 having slackened cables 82 and 84—86 through the action of spring 88 feeder 77, 78 has been drawn to the right and knife 80 has opened as also shown in Fig. 6, so that upon the retraction of rod 27 and connected parts and tautening of cable 84—86 and 82, respectively, feeder 77, 78 is shifted to the left causing a portion of tape 75 to be extended over block 74 and under frame 102 and upon completion of that shift the knife 80 is drawn downward and severs the extended portion of the tape 75a. The operator next presses handle 61a of lever 61 slightly downward, causing an upward movement of bar 98 and the spraying of liquid upon the gummed surface of the piece 75a. Further depressing the handle 61a causes upward movement of rod 71 carrying with it blocks 73, 74 and piece 75a and the pressing of the latter against the exposed portion of tie 34d and work 14a as shown in Fig. 15, producing the result shown in Figs. 16 and 17. Rod 71 and blocks 73, 74 and the work 14a are then released as above stated.

Having now described my invention, I claim:

1. In a package-tie-affixing machine, means for simultaneously punching a pair of spaced, neat holes in a package member and passing a tie therethrough, comprising a pair of spaced punch members, each of said punch members having a transverse slot on one of its ends adapted to receive tie material, said slots being in alignment with each other and each slot having an extension at each of its ends running spirally along the side of the punch member a substantial distance and being of such conformation as to receive a portion of said tie material as the punch member penetrates the package member.

2. A packaging-tie-affixing machine comprising a work support, means for securing work to said support, means for supplying tie material, means for feeding adhesive tape, means for cutting said adhesive tape, means for applying said tie material to work so secured, means for applying said adhesive tape to said tie and said work and uniting them, and means for releasing said first means from said work, said several means being interconnected; and the means for applying said tie material to said work comprising a pair of spaced punch members adapted to punch neat holes in said work and pass a portion of said tie material therethrough in one operation, each of said punch members having a transverse slot on the punching end thereof adapted to receive said tie material and extending spirally along opposite sides of the punch member a substantial distance.

HUBERT HASTINGS BURKE.